United States Patent [19]

Miyashita et al.

[11] 4,288,813
[45] Sep. 8, 1981

[54] APPARATUS FOR AUTOMATICALLY ENGRAVING MIMEOGRAPHIC STENCIL PAPERS

[75] Inventors: Takehisa Miyashita; Mujika Fujiwara, both of Tokyo, Japan

[73] Assignee: Gakken Co., Ltd., Tokyo, Japan

[21] Appl. No.: 73,844

[22] Filed: Sep. 10, 1979

[51] Int. Cl.³ ............................................. H04N 1/46
[52] U.S. Cl. ..................................................... 358/75
[58] Field of Search ................. 358/75, 299; 356/406, 356/407, 416, 419

Primary Examiner—John C. Martin
Attorney, Agent, or Firm—Basile, Weintraub & Hanlon

[57] ABSTRACT

In effecting the two-color printing from an original which is printed in black and other color by way of a mimeographic printing technique, apparatus for automatically engraving mimeographic stencil papers which decomposes the black or other colors of the original independently into two colors and reads them out to engrave two stencil papers. The engraving apparatus comprises two light-receiving elements (3,4) for reading the contents displayed on the original, color filters having different spectral characteristics which are attached to the light-receiving elements and are faced to the original, and a circuit (C) for selecting the colors to be engraved depending upon the outputs of the light-receiving elements. A single automatic engraving apparatus makes it possible to easily prepare the stencil papers for two-color printing and to reduce the color deviation when the original is set to the engraving apparatus.

4 Claims, 4 Drawing Figures

APPARATUS FOR AUTOMATICALLY ENGRAVING MIMEOGRAPHIC STENCIL PAPERS

BACKGROUND OF THE INVENTION

1. Field of the Invention

The present invention relates to an apparatus for automatically engraving mimeographic papers, by which the displays of black color and any other colors on the original are independently decomposed into two colors and are read out, to engrave two types of stencil papers.

2. Description of the Prior Art

Conventional apparatus for automatically engraving a mimeographic stencil paper had been designed mainly for making a stencil paper for a single-color mimeographic printing for use with originals which bear only black color characters. Recently, however, the popularized colored printings have been making increased demands for the development of an automatic engraving machine which is capable of producing a variety of colors even in mimeographic printing.

The automatic engraving machines which are now commercially available and which are capable of effecting multi-color printing, have been provided with a rotary color filter plate in front of a light-receiving element faced to the original such that the rotating filter plate decomposes the colored display on the original into three colors, i.e., red, blue and yellow, to thereby prepare stencil papers for each of these colors. Therefore, the conventional automatic engraving machines were considerably complex in construction, difficult to manipulate and were expensive.

Another method consists of providing two automatic engraving machines, attaching filters of dissimilar colors to the light-receiving elements of each of the engraving machines, and separating the displays of the original, depending upon the colors, to prepare stencil papers by the separate engraving machines. In this case, however, since the originals and stencil papers are wound on the drums of separate engraving machines, it is difficult to bring their positions into agreement. Thus, a deviation is developed when the original is set to engrave the stencil paper, thereby making it difficult to obtain good colored printings. Further, the use of two automatic engraving machines requires considerable expense as well as clumsy operation for handling the engraving machines.

There has also been proposed a method of using a single automatic engraving machine. In this case, however, filters of different colors must be used for engraving the displays of the original depending upon the colors. In other words, the color filter attached to the light-receiving element must be replaced for each color of the display on the original, again resulting in clumsy operation.

In particular, in effecting the colored printing, it is highly desirable to develop an engraving machine which is capable of performing simple printings of two colors, such as black and red, which are often found in leaflets folded into the newspapers.

SUMMARY OF THE INVENTION

In view of the aboved-mentioned problems and requirements, the inventors of the present invention have accomplished a simply constructed apparatus which is capable of reading the displayed contents of the original in a separate manner for each of the colors.

The present invention provides an improvement in an apparatus for automatically engraving mimeographic stencil papers including a drum for being wound with an original and stencil papers, a light-receiving portion for reading the contents disclosed in the original, and a recording portion for engraving the stencil papers. The improvement comprises two light-receiving elements having color filters with different spectral characteristics, a comparator circuit for determining the output of the light-receiving elements depending upon the magnitude of input voltages produced by said light-receiving elements, and a switching means which selectively connects the two outputs of said light-receiving elements to the two inputs of said comparator circuit, such that the contents of every color disclosed in and with which the the original is engraved are decomposed into two colors, such as (1) black and (2) any other color.

An object of the present invention is therefore to provide an apparatus for automatically engraving mimeographic stencil papers, which separately reads out the displayed contents of black color and the displayed contents of any other color of the original to engrave the stencil papers for each of the colors, so that the engraving for color printing can be easily performed and the color deviation can be reduced.

A further object of the present invention is to provide an apparatus for automatically engraving mimeographic stencil papers comprising two light-receiving elements, wherein said comparator circuit comprises two transformers and two diodes to discriminate the colors so that the stencil papers can be easily engraved for each color by way of a single engraving machine.

A still further object of the present invention is to provide an apparatus for automatically engraving mimeographic stencil papers in which a light-receiving portion is provided with two light-receiving elements contributing to the simplification of the construction of the light-receiving portion, simplification of manufacturing and reduction of the manufacturing cost.

Yet a further object of the present invention is to provide an apparatus for automatically engraving mimeographic stencil papers in which a time-constant circuit is provided on an input side of the comparator circuit such that the colors can be reliably selected.

Preferred embodiments of the present invention are mentioned below in detail with reference to the accompanying drawings, such that the invention may be fully comprehended.

In the drawing like reference characters refer to like parts throughout the several views, in which:

DESCRIPTION OF THE PREFERRED EMBODIMENTS

Figure 1:
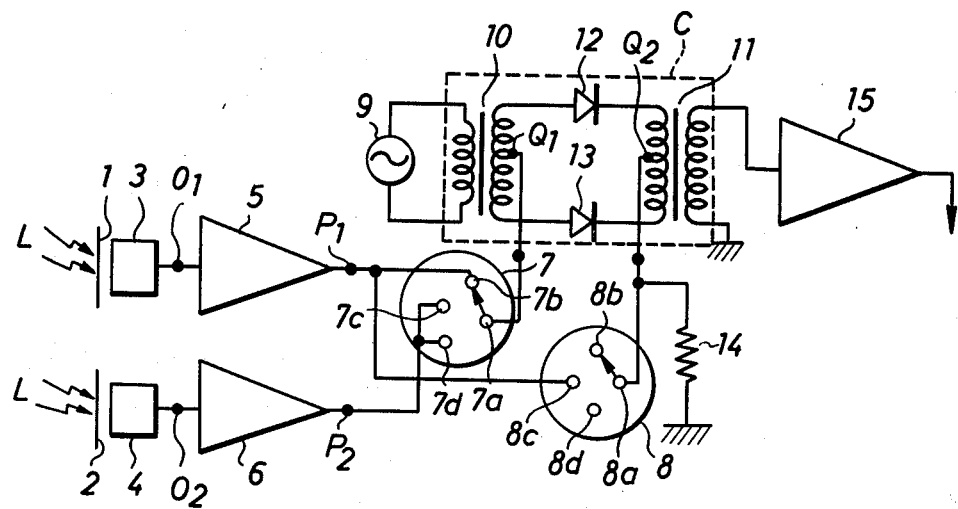
FIG. 1 is a diagram showing a circuit for selecting color signals which constitutes a major portion of an automatic engraving apparatus according to the present invention.
Figure 2:
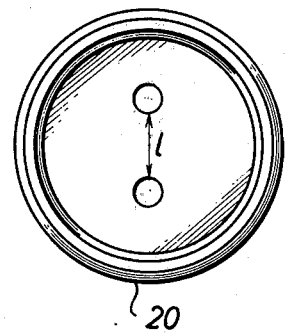
FIG. 2 is a front view of a light-receiving portion of the automatic engraving apparatus.
Figure 3:
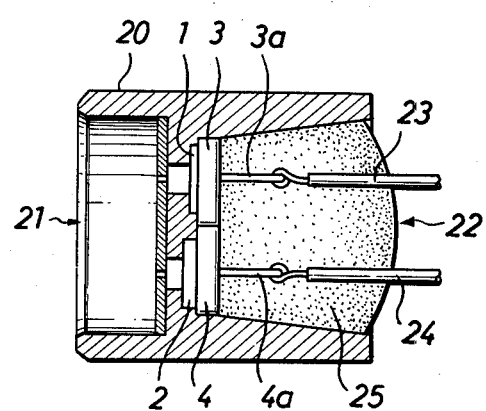
FIG. 3 is a vertical cross-sectional view through FIG. 2 showing the internal construction of the light-receiving portion.

Referring to FIGS. 1–3, an automatic engraving apparatus in accordance herewith comprises photodiodes 3 and 4 which are light-receiving elements, face an original wound on a drum of an engraving apparatus (not shown) to read out the displayed contents described on the original. Color filters 1 and 2 having different spectral characteristics are secured in front of the photodiodes 3, 4. The color filters 1, 2 may be those which are commercially available in the market.

When the light L reflected by the original is incident upon the photodiodes 3 and 4, the output characteristics at the signal levels in the outputs $O_1$, $O_2$ of the photodiodes 3, 4 for each of the colors tabulate as set forth in Table 1 due to the color filters 1 and 2.

TABLE 1

|  | Black | White | Red | Blue |
|---|---|---|---|---|
| Output $O_1$ | 0 | 1 | 0.9–1 | 0.7–0.8 |
| Output $O_2$ | 0 | 1 | 0.2–0.3 | 0.2–0.3 |

DC amplifiers 5 and 6, each containing an inverter, are connected to the output side of the photodiodes 3 and 4, whereby the signals in the outputs $O_1$ and $O_2$ are reversed on the output sides $P_1$, $P_2$ and becomes as shown in Table 2.

TABLE 2

|  | Black | White | Red | Blue |
|---|---|---|---|---|
| Output $P_1$ | 1 | 0 | 0–0.1 | 0.2–0.3 |
| Output $P_2$ | 1 | 0 | 0.7–0.8 | 0.7–0.8 |

The signal levels for each of the colors shown in Table 2 interpret as follows: when the photodiode 3 has read black displays or colors on the original, the output $P_1$ produces a signal level close to "1" (high voltage) and when it has read colors (such as white, red or blue) other than black, the output $P_1$ produces a signal of a level close to "0" (low voltage). Similarly, when the photodiode 4 has read black, red or blue on the original, the output $P_2$ produces a signal of a level close to "1" (high voltage) and when it has read white, the output $P_2$ produces a signal of a level close to "0" (low voltage).

Switches 7 and 8 are manually operable and interlocked. A contact 7b of the switch 7 is connected to the output side $P_1$ of the DC amplifier 5, while contacts 7c and 7d are connected to the output side $P_2$ of the DC amplifier 6. Contacts 8b and 8d of the switch 8 are free terminals, and a contact 8c is connected to the output side $P_1$ of the DC amplifier 5.

An AC power supply 9 is connected to the primary side of a transformer 10. The secondary side of the transformer 10 is connected to the primary side of another transformer 11 via diodes 12 and 13. The secondary side of the transformer 11 is connected to a power amplifier 15 which produces output signals such that a discharge needle (not shown) performs the engraving, depending upon the colors.

A comparator circuit C comprising transformers 10, 11, and diodes 12, 13, substantially selects the displays on the original to be engraved, depending upon the magnitude of voltages at points $Q_1$ and $Q_2$. These voltages are selectively obtained by the outputs at the above-mentioned points $P_1$, $P_2$ via (a) a movable contact 7a of the switch 7 which is connected to the neutral point $Q_1$ of the secondary winding of the transformer 10 and (b) a movable contact 8a of the switch 8 which is connected to a neutral point $Q_2$ of the primary winding of the transformer 11.

The circuit operates in the manner described hereinafter.

Assume that the original has a description of black and one other color (except white). First, the switches 7, 8 are set to the contacts 7b, 8b. In this case, the display contents of black color only of the original are read out and engraved. The underlying principle for this is explained hereinafter.

When the light-receiving elements, 3, 4 scanning the original are faced to the black displays, voltages of the level close to "1" are produced in the outputs $P_1$, $P_2$ as is obvious from Table 2. Here, the signal from the output $P_1$ is applied to the point $Q_1$ only on the secondary side of the transformer 10 via the switch 7. Hence, the point $Q_1$ acquires a high voltage as compared with the point $Q_2$, whereby engraving signals are produced via diodes 12, 13, transformer 11, and power amplifier 15. Accordingly, the displays of the black color are engraved.

In this case, when the photodiodes 3 and 4 are faced to the displays of a color other than black of the original, the output $P_1$ acquires a level close to "0" and the output $P_2$ acquires a level close to "1" as is obvious from Table 2. In this case, however, the output $P_1$ of the level "0" only is produced at the point $Q_1$ on the secondary side of the transformer 10. Therefore, the engraving output is not produced by the power amplifier 15 and a display of a color other than black is not engraved. When the photodiodes 3, 4 are faced to the white color (blank portions of the paper), the engraving signals are not produced.

After black color has been engraved, the switches 7, 8 are set to the contacts 7c, 8c. In this case, the displayed contents of a color other than black on the original are read out and engraved.

When the photodiodes 3, 4 scanning the original are faced to the displays of a color other than black, the output $P_1$ acquires the level close to "0" and the output $P_2$ acquires the level close to "1" according to Table 2. The voltage of the output $P_2$ only is applied to the point $Q_1$ on the secondary side of the transformer 10 via the switch 7, whereby the engraving signals are produced via diodes 12, 13, transformer 11 and power amplifier 15, so that the colored displays are engraved.

When the photodiodes 3, 4 are faced to the black displays on the original, the outputs $P_1$, $P_2$ acquire the level close to 1 according to Table 2, whereby the output $P_1$ is applied to the point $Q_2$ on the primary side of the transformer 11 as a terminal voltage of a resistor 14 via the switch 8, and the output $P_2$ is applied to the point $Q_1$ on the secondary side of the transformer 10 via the switch 7. Therefore, since the voltages at the points $Q_1$, $Q_2$ are equal; no potential difference is produced, and the engraving signals are not produced. Namely, when the colored displays are engraved, the black displays are not engraved. Further, when the photodiodes 3, 4 are faced to the white color, the engraving signals are not produced.

Then, the switches 7, 8 are set to the contacts 7d, 8d. In this case, the engraving is effected like an ordinary single-color engraving in which the displayed contents of black and a color other than black on the original are simultaneously engraved.

When the photodiodes 3, 4 are faced to the displays of the original, the output $P_2$ acquires a voltage level close to 1 irrespective of the color (except white) of the display and is applied to the point $Q_1$ on the secondary side of the transformer 10 via the contact 7d of the switch 7. The signal output $P_1$ is always cut off by the switch 8, and is not applied to the point $Q_2$ on the primary side of the transformer 11. Consequently, the displays of the original are engraved on the same stencil paper irrespective of the color.

As mentioned above, by attaching the color filters 1, 2, having different spectral characteristics, to the two photodiodes 3, 4, respectively, it is possible to completely separate black displays and displays of a color other than black of the original, and thereby to separately engrave them on the stencil papers using a single automatic engraving apparatus. By manipulating the switches 7, 8, the engraving can be very simply performed from the same original wound on the drum.

The light-receiving portion equipped with the color filters 1, 2, and photodiodes 3, 4 which are light-receiving elements, is shown in FIGS. 2 and 3.

A cylindrical case 20 made of a synthetic resin or the like is formed as a unitary structure, and in which are arrayed two sets of filters and photodiodes in parallel with each other. The filters and diodes are disposed between a light incident port 21 and a port 22 from which are drawn output terminals. The filters 1, 2 and photodiodes 3, 4 may simply be fitted into the case 20 to assemble the light-receiving portion. The output terminals 3a, 4a of the photodiodes 3, 4 are provided at the rear ends of the light-receiving portion, and are drawn by means of head wires 23, 24 through the port 22 for drawing the output terminals. The case is sealed with a solidifying agent 25 such as adhesive agent such that the output terminals 3a, 4a are not damaged.

As shown in FIG. 2, the photodiodes 3, 4 are oriented along a vertical axis line and are separated apart by a distance l of about 6 mm. Thus, by employing the two-input system for the light-receiving portion, the displays can be separately engraved as mentioned hereinabove. Besides, the light-receiving portion can be formed very compactly.

Figure 4:
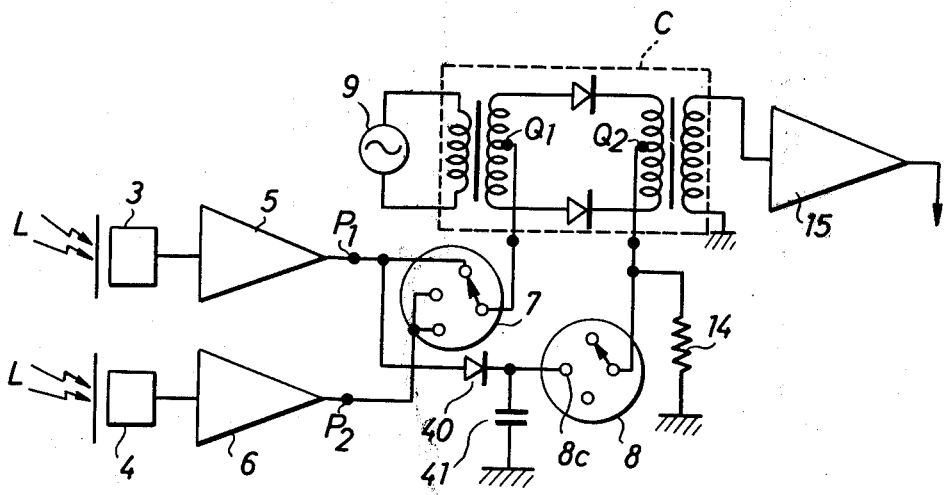
FIG. 4 is a diagram showing a selection circuit according to another embodiment of the present invention.

FIG. 4 shows a color selection circuit constructed according to another embodiment of the present invention.

According to this embodiment, a circuit comprising a diode 40 and a capacitor 41 is inserted in a line connecting the output $P_1$ and the contact 8c of the switch 8. With this circuit, it is possible to completely prevent the engraving of black displays when the displays of a color other than black are being engraved. With the circuit shown in FIG. 1, when the photodiode 3 is faced to a color other than black and the photodiode 4 is faced to the black color, the output $P_1$ acquires the level "0", and the output $P_2$ instantaneously acquires the level "1", such that the black displays are slightly engraved. According to the circuit shown in FIG. 4, on the other hand, the output $P_1$ is maintained at the level close to "1" for a predetermined period of time utilizing the charging-discharging function of the capacitor 41, thereby preventing the black displays from being engraved. Thus, it is possible to engrave the black displays and the displays of a color other than black in a completely separated manner even from the same original wound on the drum. Consequently, it is possible to prepare the stencil papers for effecting vivid two-color printing.

What is claimed is:

1. In an apparatus for automatically engraving mimeographic stencil papers including a drum for being wound with an original and stencil papers, a light-receiving portion for reading the contents disclosed in the original and a recording portion for engraving the stencil papers, the improvement which comprises:

two light-receiving elements having color filters with different spectral characteristics, each element having an output, a comparator circuit for determining the output of the light receiving elements depending upon the magnitude of input voltages into the circuit produced by said light-receiving elements, and a switching means which selectively connects the two outputs of said light-receiving elements to the two inputs of said comparator circuit, such that the contents of every color engraved in the original is decomposed into two colors, one being black and the other any other color.

2. An apparatus for automatically engraving mimeographic stencil papers according to claim 1, wherein said comparator circuit includes two transformers and two diodes.

3. An apparatus for autmomatically engraving mimeographic stencil papers according to claim 1, wherein said two light-receiving elements are parallel and disposed in a single light-receiving portion.

4. An apparatus for automatically engraving mimeographic stencil papers according to claim 1, wherein a time-constant circuit is provided on an input side of said comparator circuit.

* * * * *